United States Patent Office 3,458,208
Patented July 29, 1969

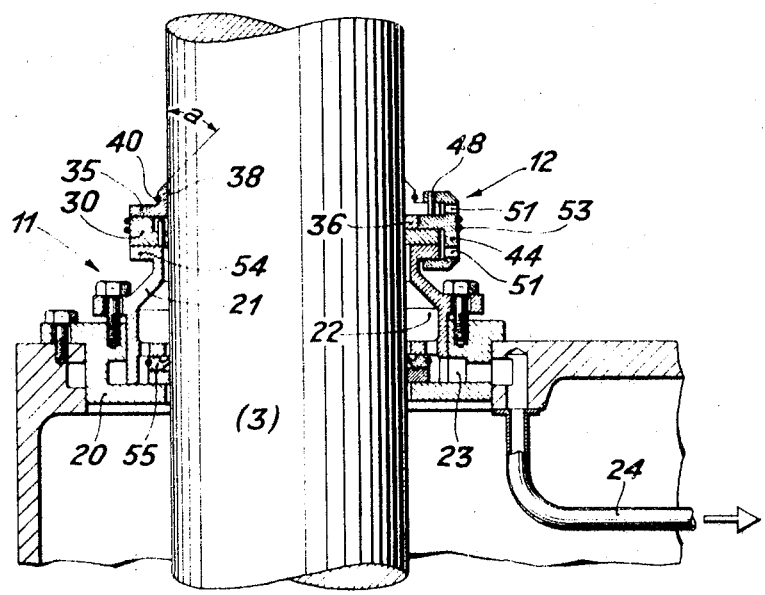
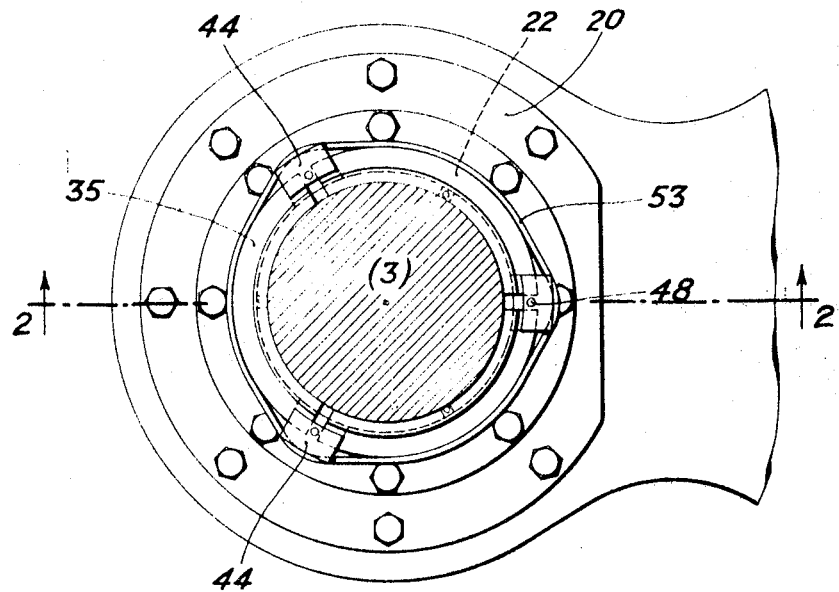

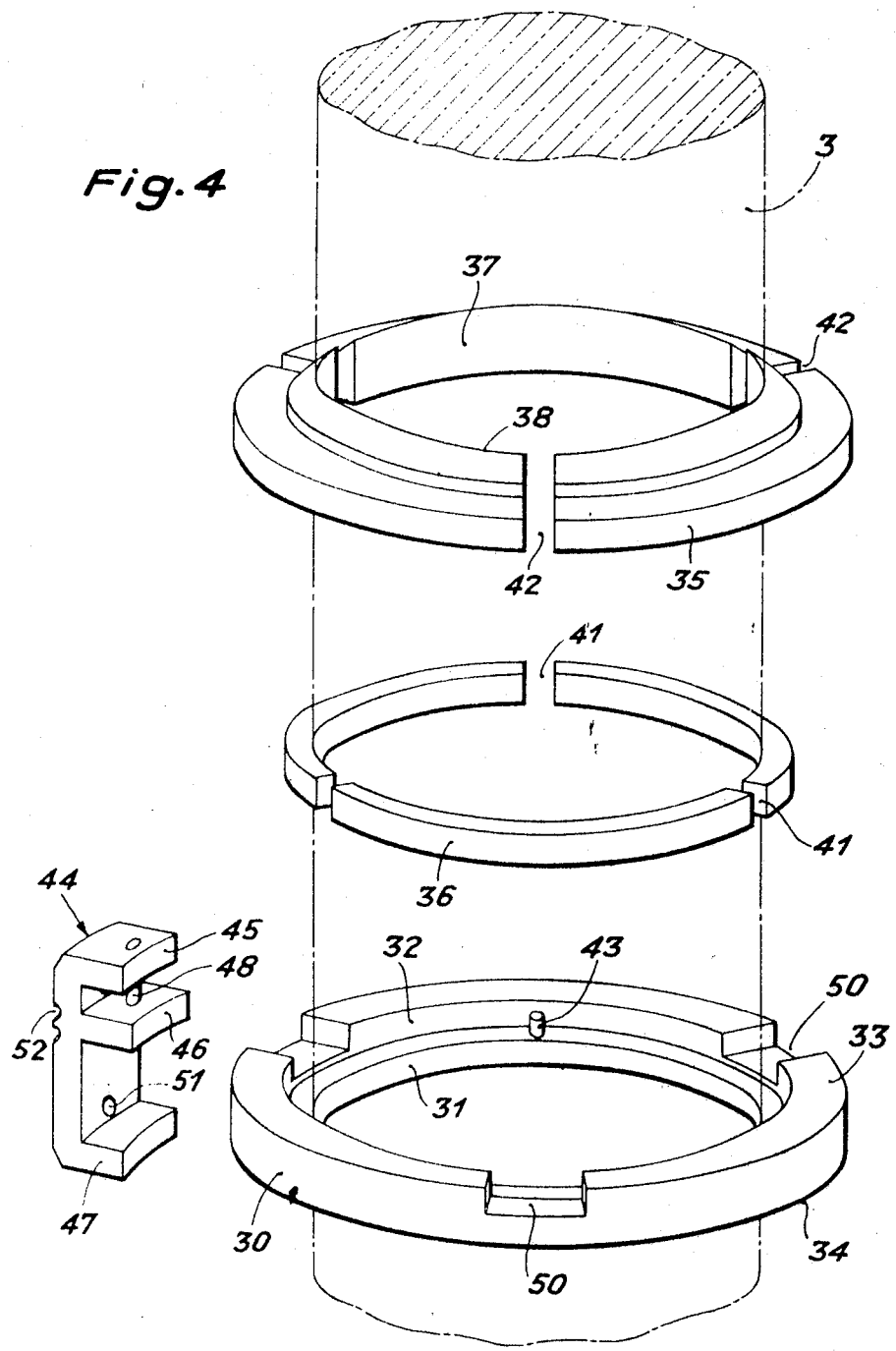

3,458,208
PISTON ROD SEAL
Richard Jung, Kaserei, Niederstetten, Switzerland, assignor to Sulzer Brothers Limited, Winterthur, Switzerland, a Swiss company
Filed Mar. 21, 1967, Ser. No. 624,859
Claims priority, application Switzerland, Mar. 25, 1966, 4,381/66
Int. Cl. F16j 9/06; F02f 5/00
U.S. Cl. 277—154        8 Claims

ABSTRACT OF THE DISCLOSURE

There is disclosed a piston rod seal comprising an integral ring, two split rings, clips holding the three rings coaxially together with the joints of the split rings in circumferentially staggered position, and springs to stress the sections of the split rings against the piston rod. The clips also engage a support or carrier to retain the assembly of rings against motion with the piston rod, which they surround, and the clips also permit lateral motion of the ring assembly, with the piston rod, by reference to that carrier.

BACKGROUND OF THE INVENTION

The field of the invention

The invention pertains to seals for piston rods of internal combustion engines, particularly those of the crosshead-type in which the piston rods execute parallel motion, being affixed at one end to a piston and at the other end to a crosshead moving in guide ways parallel to the cylinder.

In internal combustion engines having cylinders of large diameter, piston rod seals or packings serve to close off from the crankcase a space underneath the piston. In two-stroke cycle engines this space is filled with air at supercharging pressure and is, moreover, exposed to contamination by residual product of combustion. The seal is therefore intended to prevent passage into the crankcase of scavenging and charging air. It is also intended to hold to a minimum contamination of the lubricating oil in the crankcase from products of combustion, at the same time permitting a certain lateral motion of the piston rod both at the cylinder and crosshead ends thereof.

DESCRIPTION OF THE PRIOR ART

Various types of seals have been developed which, however, do not fully respond to these requirements or which have not proven entirely satisfactory in service. The seals heretofore proposed all lose their effectiveness after a certain operating time, and replacement thereof is relatively complicated.

SUMMARY OF THE INVENTION

It is an object of the invention to provide a seal of the type described which shall be capable of fulfilling its function over a long period of time notwithstanding wear thereon and thus to remain tight against the charging air pressure, and at the same time to clear the piston rod of oily products of combustion. At the same time, it is an object of the invention to provide such a seal in which the elements thereof can be removed with few manipulations and without disassembly of the piston rod.

The invention provides a seal comprising an integral ring and plural split rings held together in coaxial relation around the piston rod and against longitudinal motion therewith by means of clips or retainers and springs which press the split rings against the piston rod and hold them in fixed circumferential relation to each other and to the integral ring, with their joints staggered, while allowing the assembly of rings to shift laterally with the piston rod and to rotate around it. The integral ring includes a counterbore accommodating one of the split rings while the other split ring rests on and is held by the retainers against the integral ring outside the counterbore therein.

BRIEF DESCRIPTION OF THE DRAWINGS

The invention will now be further described in terms of a non-limitative exemplary embodiment and with reference to the accompanying drawings in which:

FIG. 2 is a partial reproduction of FIG. 1 at an enlarged scale, particularly illustrating the seal of the invention, FIG. 2 being moreover a sectional view taken on the line 2—2 of FIG. 3;

FIG. 3 is a plan view of the apparatus shown in FIG. 2; and

FIG. 4 is an exploded perspective view of the packing of the invention as illustrated in FIGS. 2 and 3.

In FIG. 1 there is shown an internal combustion engine having a cylinder 1, a piston 2, a piston rod 3, a crosshead 4, and a crankcase 5. Beneath the piston is disposed an air chamber 6 containing scavenging and charging air, which for the position of the piston shown passes through the slots 7 in the cylinder wall into the space inside the cylinder and above the piston. Between the crankcase 5 and the air chamber 6 are provided two plates or partitions 8 and 9 which define between them a hollow space 10 which is accessible from the exterior of the engine. The plate 8 has an opening therein in which is mounted a seal support assembly generally indicated at 11 and which in turn supports the seal, generally indicated at 12.

Referring to FIG. 2, the support assembly 11 comprises a floor plate 20 and a seal carrier 21 which latter supports the seal 12 proper. The carrier 21 of generally annular shape, widened at one end to include a hollow space 22 which can be ventilated through conduits 23 in the floor plate 20 and the plate 8, and through a tube 24 leading outside the engine. This construction prevents flow into the space 10 of any compressed air from chamber 6 which may get past the seal 12. Further to this same end, there is provided between the carrier 21 and the floor plate 20 a packing 55 which may be of known type and whose additional function it is to remove from the piston rod any lubricating oil still adhering thereto.

Referring to FIGS. 2, 3 and 4, the seal 12 comprises a one-piece guide ring 30 having a bore 31 and counterbore 32. The diameter of the bore 31 is chosen to provide a small clearance between it and the piston rod. The diameter of the counterbore 32 is larger and is chosen so as to accommodate a three-part split inner sealing ring 36 (FIG. 4) filling the counterbore with small clearance. The guide ring 30 has plane parallel end faces 33 and 34. The ring 30 lies at its end face 34 on a similar plane end face of the carrier 21. The end face 33 of the guide ring 30 serves to support a second split sealing ring 35, also in three parts. The axial height of the inner ring 36 is so dimensioned that its upper surface lies flush with the upper end face 33 of the ring 30. The three-part sealing ring 35 possesses a cylindrical inner surface 37 which serves as a sealing surface cooperating with the piston rod. The sealing ring 35 is provided with an axial extension of reduced outer diameter which terminates in a conical surface 38 whose half-cone angle $a$ (FIG. 2) is less than 90°. In the cylindrical outer surface of the extension on which this conical surface is formed, there may be provided a groove accommodating a circumferential helical tension spring 40 (FIG. 2).

Figure 1:
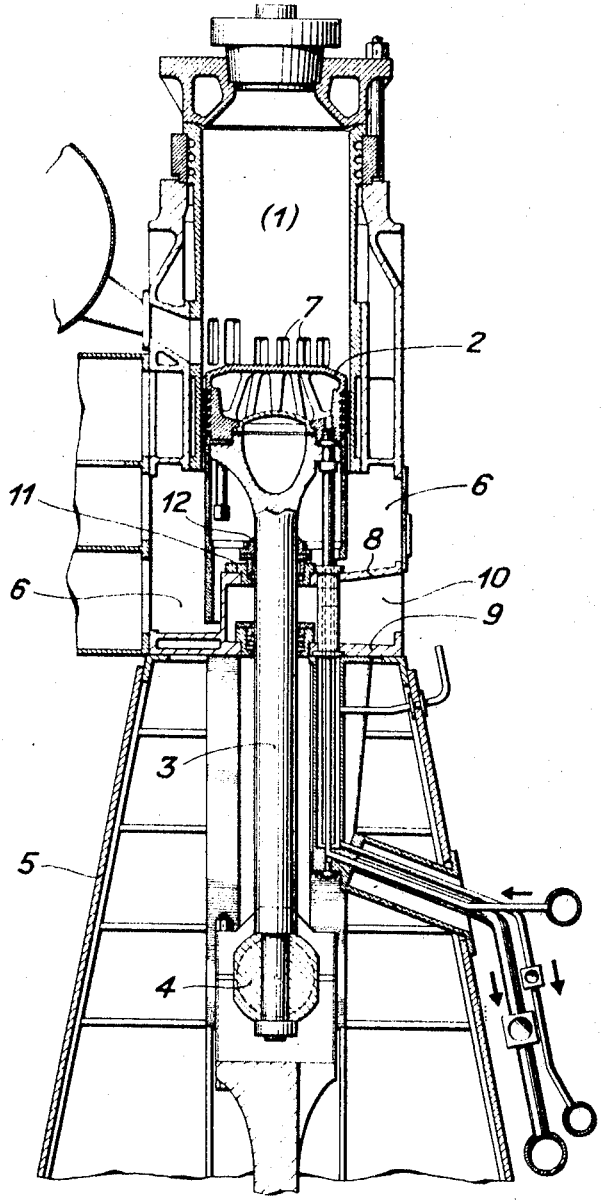
FIG. 1 is a transverse axial section through a cylinder of an internal combustion engine whose piston rod is provided with the seal of the invention.

The three-part inner ring 36 is split at three points 41 whereas the ring 35 is split at three points 42. The guide ring 30 has three pins 43 (of which one is visible in FIG. 4), uniformly spaced about the periphery of the ring 30 and each engaging between two of the three sections of ring 36, so as to locate the joints in ring 36 with respect to ring 30 and to prevent rotation of the ring 36 circumferentially of the piston rod axis with respect to the guide ring 30.

Three clips or retainers 44 are provided to press the sections of the ring 36 against the piston rod, to prevent rotation of the ring 35 with respect to the guide ring 30 (and hence with respect to the ring 36), and to hold the various elements of the seal 12 together and to support them on the carrier ring 21. The clips 44 each include three parallel extending lugs 45, 46 and 47 of rectangular cross-section. The guide ring 30 has three notches 50 cut in its end face 33, uniformly spaced about its periphery for accommodation of the middle lugs 46 of the slips and circumferentially displaced from or staggered with respect to the pins 43. The notches 50 extend radially inward to the counterbore 32 and have a depth below the face 33 no greater than that of that counterbore. The middle lugs 46 of the three clips fill these notches except for a small clearance and serve to seal them. The lower lugs 47 engage beneath a flange 54 of the carrier 21 and thereby secure the seal 12 against axial motion as the piston rod moves. The upper lugs 45 in turn engage over the lower portion or flange of the sealing ring 35, as also shown in FIG. 2. Between the lugs 45 and 46 on each clip there is provided a pin 48 which upon assembly of the packing is engaged into one of the joints 42 between two adjacent sections of the ring 35. The upper lugs 45 thus each engage over the adjacent ends of two of the three sections of ring 35, as indicated by the phantom showing in FIG. 3.

The clips 44 serve not only to prevent rotation of the parts of the ring 35 with respect to the guide ring 30 by operation of the pins 48, but also prevent a lifting of the seal from the support plate during upward motion of the piston. To permit the passage of residual products of combustion through the slots 42, the clips 44 may be provided with bores 51 passing out to the exterior thereof. The clips also have grooves formed in the outer surfaces thereof, as indicated at 52 in FIG. 4, which serve to accommodate circumferential helical tension springs 53 (FIG. 3) which press the lugs 44 radially inward and thereby press the sections of ring 36 against the piston rod.

During operation of the engine, the seal of the invention serves to preserve the charging and scavenging air pressure in the chamber 6, due to the staggered circumferential arrangement of the slots 41 in the split ring 36 with respect to the slots 42 in the split ring 35. This staggered arrangement is preserved by engagement of the sections of ring 36 with ring 30 at pins 43, by engagement of the clips 44 with ring 30 at the notches 50, and by engagement of the pins 48 in the clips between adjacent sections of the ring 35. The sections of the split ring 35 are held against the piston rod by the helical tension spring 40 and by the operation of the air pressure itself. The sections of the ring 36 in turn are pressed against the piston rod 3 by operation of the helical tension springs 53 in the grooves 52, via the lugs 46 of the clips which lugs bear against the sections of the ring 36. The exterior shape of the seal is, as shown in FIG. 2, so chosen that the residual products of combustion, which have the form of a dirty and viscous oil, can freely flow off of the seal. Those parts of the seal which are subjected to wear, i.e. the rings 35 and 36, can readily be disassembled after loosening of the springs 40 and 53, whose ends can simply be hooked together. To then remove the sections of the rings 35 and 36, it is necessary only to withdraw the clips 44, whereupon those sections can be withdrawn and replaced.

The unavoidable lateral motions of the piston rod due to play of the piston in the cylinder and of the crosshead in its guides are taken up by the guide ring 30. In the course of such lateral motions, this guide ring carries the whole seal 12 with it so that the actual sealing parts thereof, i.e. the rings 35 and 36, are protected against the excessive wear which might otherwise be caused by such lateral motions. Moreover, with the construction of the invention, the whole seal 12 is free to rotate on the flange 54 of the carrier 21. The lateral motions of the piston rod give rise to a tendency for the seal to rotate, which in the invention is exploited so as to distribute uniformly the wear undergone by it.

The rings 35 and 36 can be made from either a larger or a smaller number of parts or sections than the three parts shown in the drawings. Division of these rings into three parts has the advantage that upon upward motion of the piston rod, the individual parts of the ring have no inclination to tip or tilt about axes perpendicular to the length of the piston rod because as to each section, the effective center of the force exerted by friction between the piston rod and that section is located approximately on the straight line joining the clips at the ends of such section.

Advantageously, the guide ring 30 may be made of steel with a layer of anti-friction bearing material for the bore 31 therein. The split rings 35 and 36 may be made of bronze. Individual parts, or indeed all parts of the seal may however be made of suitable synthetic material.

While the invention has been described hereinabove in terms of a presently preferred embodiment thereof, the invention itself is not limited thereto but rather includes all modifications on and departures from that embodiment falling within the spirit and scope of the appended claims.

I claim:

1. A piston rod seal comprising an integral ring having two plane parallel end faces and having a counterbore therein, a first split ring having plural sections disposed coaxially of said integral ring within said counterbore and of axial height substantially equal to the depth of said counterbore, a second split ring having plural sections, and means to support the sections of said second split ring coaxially of said integral ring.

2. A seal according to claim 1 including elastic means to press the sections of said second split ring radially inward toward the common axis of said rings.

3. A seal according to claim 2 wherein said second split ring has formed at the axial end thereof remote from said integral ring a conical surface whose half-cone angle is less than 90°.

4. A seal according to claim 1 wherein the integral ring includes means to
  (a) space the sections of said first split ring from each other, and
  (b) hold the sections of said first split ring in fixed position circumferentially of the axis of the integral ring.

5. A seal according to claim 1 wherein each of said split rings includes three sections.

6. A seal according to claim 1 further including an annular support and wherein said integral ring has formed therein a plurality of notches equal in number to the number of sections in said first split ring, said seal further including as said means for each of said notches a clip having three lugs of which the center lug is engageable with one of said notches, one end lug is engageable over said annular support, and the other of said end lugs is engageable over the adjacent ends of two adjacent sections of said second split ring.

7. A seal according to claim 6 wherein each of said clips includes means to space from each other circumferentially the two sections of said second split ring engaged by such clip.

8. A seal according to claim 6 wherein said center lugs bear each against one section of said first split ring, and resilient means to stress said center lugs toward the axis of said integral ring.

References Cited

UNITED STATES PATENTS

| | | | |
|---|---|---|---|
| 2,084,235 | 6/1937 | Badeker | 277—154 X |
| 2,888,286 | 5/1959 | Scheffler et al. | 277—154 X |
| 3,235,275 | 2/1966 | Hart | 277—154 |

FOREIGN PATENTS

| | | |
|---|---|---|
| 617,951 | 3/1927 | France. |
| 917,346 | 7/1954 | Germany. |

LAVERNE D. GEIGER, Primary Examiner

J. S. MEDNICK, Assistant Examiner

U.S. Cl. X.R.

277—101, 136, 194, 199